Patented Apr. 14, 1931

1,800,985

UNITED STATES PATENT OFFICE

LEWIS B. ESMOND, OF BOSTON, MASSACHUSETTS, AND WERNER W. DUECKER, OF PITTSBURGH, PENNSYLVANIA

METHOD OF PREPARING EDIBLE EMULSIONS OF SOLID IN FAT AND PRODUCT THEREOF

No Drawing. Application filed March 6, 1929. Serial No. 344,911.

Our invention relates to the preparation of edible emulsions of solids in fats such as are employed in confectionery, cake icing, and the like, and consists in a modification in the composition and in the method of preparation, in consequence of which the emulsion is stabilized and its quality is improved. We shall first describe our invention in specific application to the preparation of chocolate, and then indicate its wider applicability.

When chocolate or articles containing chocolate, such as chocolate-covered candy, are kept for some time under ordinary store conditions, or when such articles are kept under fluctuating conditions of temperature, the consistency changes; they tend to become granular; and soon lose their initial glossy, shiny appearance and become dull and aged. Sometimes they seem to be covered with a thin white film or bloom. The bloom on chocolate is generally regarded as of two types. It is common, in the preparation of such articles, to incorporate with the chocolate a quantity of wax or fat, ordinarily cocoa butter, in order to prevent or to delay the progress of the undesired granulation; and it is thought that fluctuations of temperature cause some of the fat to crystallize and to appear on the surface as a thin white film. The second type of blooming is thought to be produced upon such articles as contain sugar, as all articles of confectionery do, and is thought to be produced after the articles have been exposed in an atmosphere of rather high humidity. The moisture in the air dissolves superficially the sugar in the chocolate; and, on subsequent evaporation, the sugar remains, crystallized upon the surface. The blooming of chocolate confectionery has hitherto been beyond control, and continues to be a cause of heavy losses to candy manufacturers.

In the preparation of chocolate, cocoa beans cracked into nibs and roasted are crushed in a mill. The whole becomes, under treatment and at the somewhat elevated temperature of operation, a fluid mass, known as "chocolate liquor." To this mass, for the preparation of such products as we have named, cocoa butter is added and, ordinarily, sugar also.

In the practice of our invention, a quantity of cocoa butter is placed in a suitable mixer and to it edible gelatine, preferably dry and in finely divided form, is added. To this water is added, with the immediate effect of causing the gelatine to swell. Grinding and mixing continue, until an emulsion has been obtained of swollen gelatine in cocoa butter. To this emulsion sugar is added and chocolate liquor and grinding and mixing are continued at elevated temperature, until the water has been either entirely driven off or reduced to the desired small ratio. The following illustrative case is typical.

One hundred pounds of cocoa butter are placed in the grinding and mixing apparatus, and to this 14 pounds 10 ounces of finely divided dry gelatine are added, and 142 ounces of water are added. The mixture is milled until a uniform distribution of the gelatine in the cocoa butter has been obtained. Five hundred pounds of chocolate liquor and 450 pounds of powdered sugar are then added, and, a temperature of 140° F. being maintained, the mass is ground until the water content has been substantially all driven off, the solids finely divided, and the whole brought to smooth condition. The mass then is finished in usual manner.

Edible gelatine varies widely in grade or quality. We preferably employ gelatine made from calf stock, as neutral as possible in the matter of acidity, and of relatively high gel strength and viscosity. The higher the gel strength the less the quantity of gelatine required. We find it desirable to employ the gelatine when comminuted to such degree of fineness as to pass through a 60-mesh sieve.

The relative quantities of cocoa butter, sugar, and chocolate liquor may be varied as desired, to meet particular conditions of use. Sugar may be omitted; it is not essential to the process.

The product of our improved process, when compared with the product of the usual process not involving the use of gelatine, possesses these characteristics: Plasticity is increased, and in consequence the covering power, when the material is used as a coating, is increased (actually by as much as 5 to 10%). Crystallization of sugar is retarded, and in consequence the tendency to granulation is diminished. The product of our improved process is superior in smoothness of body, and because of such smoothness of body the milling time may be reduced to an extent as great as one half while the quality of the product is maintained. The surface of the confection or coating is of smoother and more glossy appearance. Both sugar blooming and fat blooming are retarded. And the retardation of fat blooming is particularly noticeable if the sugar content be high.

Debased preparations are known, formed by separating the cocoa and the cocoa butter which together constitute chocolate in the proper sense of the term, and by then combining with the cocoa another fat of inferior grade, quality, and flavor. Such debased preparations resemble true chocolate in appearance and approximate true chocolate in flavor, and in popular usage are not distinguished, but are called chocolate also. These debased preparations are susceptible to the practice of our invention, and by like procedure. With the fat, whether cocoa butter or another fat of inferior grade, gelatine swollen with water is in the manner described combined in the form of an emulsion. To this emulsion the modified chocolate liquor is added and sugar also, if desired, and the method proceeds as described above, to produce a similar though inferior product, improved, however, in the feature described.

Chocolate may be regarded as a fat carrying in the form of an emulsion a coloring and flavoring substance, which substance is cocoa. Our invention is applicable to stabilize and to improve the quality of emulsions generally of finely divided solid in fat. For example, a coating material for confectionery may consist of an emulsion of sugar in a fat. The viscosity of this material may be increased, its covering power may be increased, and its tendency to become hard with age may be diminished by incorporating in it gelatine, after the manner described.

We claim as our invention:

1. That step in the preparation of edible emulsions of finely divided solid material in fat herein described which consists in adding to a quantity of fat gelatine in finely divided and solid condition together with water, grinding the components to a condition of emulsion of the water-swollen gelatine in fat, adding to such emulsion a second emulsion of another solid material in fat, and grinding the whole to a homogeneous mass.

2. That step in the preparation of chocolate herein described which consists in adding to a quantity of cocoa butter gelatine in finely divided and solid condition and water and grinding the components to a condition of an emulsion of water-swollen gelatine in fat, adding to such emulsion chocolate liquor and continuing the grinding at elevated temperature and with the escape of water until the whole is brought to a smooth and homogeneous mass.

In testimony whereof we have hereunto set our hands.

LEWIS B. ESMOND.
WERNER W. DUECKER.